United States Patent
Shah et al.

(10) Patent No.: US 11,061,953 B2
(45) Date of Patent: Jul. 13, 2021

(54) METHOD AND SYSTEM FOR EXTRACTION OF RELEVANT SECTIONS FROM PLURALITY OF DOCUMENTS

(71) Applicant: Tata Consultancy Services Limited, Mumbai (IN)

(72) Inventors: Mahek Shah, Pune (IN); Rajiv Srivastava, Pune (IN); Girish Keshav Palsikhar, Pune (IN)

(73) Assignee: TATA CONSULTANCY SERVICES LIMITED, Mumbai (IN)

( * ) Notice: Subject to any disclaimer, the term of this patent is extended or adjusted under 35 U.S.C. 154(b) by 419 days.

(21) Appl. No.: 16/216,679

(22) Filed: Dec. 11, 2018

(65) Prior Publication Data

US 2019/0179842 A1    Jun. 13, 2019

(30) Foreign Application Priority Data

Dec. 11, 2017 (IN) ............................. 201721044487

(51) Int. Cl.
*G06F 16/00* (2019.01)
*G06F 16/35* (2019.01)
(Continued)

(52) U.S. Cl.
CPC ............ *G06F 16/35* (2019.01); *G06F 16/313* (2019.01); *G06F 40/137* (2020.01); *G06F 40/149* (2020.01); *G06F 40/169* (2020.01); *G06F 40/258* (2020.01); *G06F 40/295* (2020.01); *G06F 40/30* (2020.01)

(58) Field of Classification Search
CPC ........ G06F 16/35; G06F 40/30; G06F 40/137; G06F 40/149; G06F 40/169; G06F 40/258; G06F 40/295; G06F 16/313
See application file for complete search history.

(56) References Cited

U.S. PATENT DOCUMENTS 6,463,430 B1 * 10/2002 Brady .................. G06F 16/353
6,728,695 B1 *  4/2004 Pathria ................. G06F 16/313
(Continued)

OTHER PUBLICATIONS

Kun Yu et al, "Resume Information Extraction with Cascaded Hybrid Model", Jun. 2005, pp. 499-506 (Year: 2005).*
(Continued)

*Primary Examiner* — Jared M Bibbee
(74) *Attorney, Agent, or Firm* — Finnegan, Henderson, Farabow, Garrett & Dunner LLP

(57) ABSTRACT

Embodiments of the present disclosure, implements method of extracting relevant sections from a plurality of documents by (a) receiving an input document from a user; (b) converting, the input document to a standard text file; (c) classifying, the standard text file to obtain a labelled text file associated with at least one cluster from a plurality of clusters; (d) extracting, from the labelled text file to obtain a plurality of relevant entities associated with at least one cluster in the plurality of clusters; (e) annotating, the standard text file by the extracted plurality of relevant entities to obtain an annotated enriched text file; (f) identifying, a plurality of section boundaries to obtain a sectioned data; and (g) extracting, relevant sections of the plurality of documents based on the plurality of relationship associated with the set of relevant entities.

8 Claims, 6 Drawing Sheets

(51) Int. Cl.
*G06F 40/30* (2020.01)
*G06F 40/137* (2020.01)
*G06F 40/149* (2020.01)
*G06F 40/169* (2020.01)
*G06F 40/258* (2020.01)
*G06F 40/295* (2020.01)
*G06F 16/31* (2019.01)

(56) References Cited

U.S. PATENT DOCUMENTS

| | | | | |
|---|---|---|---|---|
| 8,620,079 | B1* | 12/2013 | Rubio | G06K 9/00469 |
| | | | | 382/175 |
| 9,189,514 | B1* | 11/2015 | Myslinski | G06F 16/3331 |
| 2006/0149775 | A1 | 7/2006 | Egnor | |
| 2007/0011134 | A1* | 1/2007 | Langseth | G06F 16/254 |
| 2008/0114724 | A1* | 5/2008 | Indeck | G06F 16/334 |
| 2008/0114725 | A1* | 5/2008 | Indeck | G06F 16/22 |
| 2009/0113351 | A1* | 4/2009 | Tomizawa | G06F 16/38 |
| | | | | 715/853 |
| 2011/0295759 | A1* | 12/2011 | Selvakummar | G06Q 10/1053 |
| | | | | 705/321 |
| 2011/0302100 | A1* | 12/2011 | Selvakummar | G06Q 10/1053 |
| | | | | 705/321 |
| 2012/0310868 | A1* | 12/2012 | Martins | G06F 16/313 |
| | | | | 706/12 |
| 2013/0018904 | A1* | 1/2013 | Mankala | G06F 16/93 |
| | | | | 707/756 |
| 2013/0198126 | A1* | 8/2013 | Kumar | G06F 16/245 |
| | | | | 706/46 |
| 2013/0198599 | A1* | 8/2013 | Kumar | G06F 40/177 |
| | | | | 715/227 |
| 2014/0033010 | A1* | 1/2014 | Richardt | G06F 40/114 |
| | | | | 715/222 |
| 2014/0265294 | A1* | 9/2014 | Lenhard | B42D 1/008 |
| | | | | 281/29 |
| 2014/0348396 | A1* | 11/2014 | Laaser | G06K 9/00442 |
| | | | | 382/113 |
| 2016/0055376 | A1* | 2/2016 | Koduru | G06K 9/4604 |
| | | | | 382/176 |
| 2016/0353182 | A1* | 12/2016 | Hellier | H04N 21/435 |
| 2016/0371249 | A1* | 12/2016 | Chilakamarri | G06F 16/258 |
| 2017/0061382 | A1* | 3/2017 | Zhang | G06Q 10/1053 |
| 2017/0131974 | A1* | 5/2017 | Balasubramanian | G06F 8/30 |
| 2017/0300565 | A1* | 10/2017 | Calapodescu | G06F 16/278 |
| 2018/0144042 | A1* | 5/2018 | Sheng | G06F 16/285 |

OTHER PUBLICATIONS

Sunil Kumar Kopparapu, "Automatic Extraction of Usable Information from Unstructured Resumes to Aid Search", 2010, IEEE, pp. 99-103 (Year: 2010).*

* cited by examiner

SUBMIT RESUMES

Select folder containing resumes

…../ test teac    Browse 2 files selected

☐ UseNewRinx

Submit

FIG. 4A

SUBMIT RESUMES > EXTRACT PROFILES > VIEW PROFILES

Education Profile (S)   Work Profile (S)   Role Profile (S)   Skill Profile (S)

Search candidate      Search skill/role/institute

HIDE COLUMNS

| Candidate | Role | Role seniority | # years | # projects | # customers | #Skills | #certifications | # Trainings | # Awards |
|---|---|---|---|---|---|---|---|---|---|
| Rahul Goswami | Analyst | 6 | 11.16 6 | 2 | 1 | 1 | 0 | 0 | 0 |
| Sai Sankar M | Developer | 2 | 1.33 | 2 | 2 | 1 | 0 | 0 | 0 |
| Sai Sankar M | Desinger | 5 | 11.08 3 | 2 | 2 | 0 | 0 | 0 | 0 |

FIG. 4C

METHOD AND SYSTEM FOR EXTRACTION OF RELEVANT SECTIONS FROM PLURALITY OF DOCUMENTS

PRIORITY CLAIM

This U.S. patent application claims priority under 35 U.S.C. § 119 to: India Application No. 201721044487, filed on 11 Dec. 2017. The entire contents of the aforementioned application are incorporated herein by reference.

TECHNICAL FIELD

This disclosure relates generally to sectioning of documents, and, more particularly, to a system and a method for extraction of relevant entities or sections from a plurality of documents.

BACKGROUND

Text documents can be described by a number of abstract concepts such as semantic category, writing style, or sentiment. Consider an example of a recruitment process wherein during preliminary screening phase, Talent Acquisition (TA) team of an organization uses a candidate's resume as a primary source of information to identify suitable candidates for job openings. The resume of each individual candidate is personalized and presents information in different format depending on each candidate's educational background, prior work experience and so on. The TA team may be required to manually review cumbersome amount of resumes to screen and short-list the right candidate. This process of manually shortlisting the relevant resumes of candidates is tedious, bias-prone, time consuming, non-standard and subjective.

In an existing system, the TA team may search for a resume in a database or a job portal using options such as keywords associated with the job. The search results of the job portals provide only elementary content extraction with keyword based search that identify only individual keywords or entities but fail to capture the relation between entities. These generic search results are screened or analyzed by the TA team with their limited technical understanding of a specific job description. Thus the generic search using individual keywords with limited understanding of the job description would result in the selection of few irrelevant resumes or may also result in rejection of relevant resumes.

SUMMARY

Embodiments of the present disclosure present technological improvements as solutions to one or more of the above-mentioned technical problems recognized by the inventors in conventional systems. For example, in one embodiment, a processor implemented method of extracting relevant sections from a plurality of documents is provided. The method includes (a) receiving an input document from a user; (b) converting, by a convertor module, the input document to a standard text file; (c) classifying, the standard text file to obtain a labelled text file associated with at least one of a cluster from a plurality of clusters; (d) extracting, by an entity extraction module, from the labelled text file to obtain a plurality of relevant entities associated with at least one of a cluster in the plurality of clusters; (e) annotating, in the sectioning module, the standard text file by the extracted plurality of relevant entities to obtain an annotated enriched text file; (f) identifying, by a sectioning module, a plurality of section boundaries to obtain a sectioned data, wherein the sectioned data comprises a plurality of relationship associated with set of relevant entities; and (g) extracting, by the entity extraction module, relevant sections of the plurality of documents based on the plurality of relationship associated with the set of relevant entities.

In an embodiment, format of the input document may be at least one of a word, a Portable Document Format (PDF), a text, a Rich Text Format (RTF). In one embodiment, the plurality of clusters may be obtained based on at least one of a type, a domain and a content distribution of the document. In an embodiment, the plurality of section boundaries may be identified based on the annotated enriched text file, a linguistic, a semantic and a plurality of domain specific features. In an embodiment, a specific weight may be assigned to each of the plurality of domain specific features.

In another embodiment, there is provided a processor implemented system to extract relevant sections from a plurality of documents. The system processor implemented comprises: a memory storing instructions; one or more communication interfaces; and one or more hardware processors coupled to the memory via the one or more communication interfaces, wherein the one or more hardware processors are configured by the instructions to: (a) receive, an input document from a user; (b) convert, the input document to a standard text file; (c) classify, the standard text file to obtain a labelled text file associated with at least one of a cluster from a plurality of clusters; (d) extract, from the labelled text file to obtain a plurality of relevant entities associated with at least one of a cluster in the plurality of clusters; (e) annotate, the standard text file by the extracted plurality of relevant entities to obtain an annotated enriched text file; (f) identify, a plurality of section boundaries to obtain a sectioned data, wherein the sectioned data comprises a plurality of relationship associated with set of relevant entities; and (g) extract, relevant sections of the plurality of documents based on the plurality of relationship associated with the set of relevant entities.

In an embodiment, format of the input document may be at least one of a word, a Portable Document Format (PDF), a text, a Rich Text Format (RTF). In one embodiment, the plurality of clusters may be obtained based on at least one of a type, a domain and a content distribution of the document. In an embodiment, the plurality of section boundaries may be identified based on the annotated enriched text file, a linguistic, a semantic and a plurality of domain specific features. In an embodiment, a specific weight may be assigned to each of the plurality of domain specific features.

In yet another embodiment, there are provided one or more non-transitory machine readable information storage mediums comprising one or more instructions which when executed by one or more hardware processors causes (a) receiving an input document from a user; (b) converting, by a convertor module, the input document to a standard text file; (c) classifying, the standard text file to obtain a labelled text file associated with at least one of a cluster from a plurality of clusters; (d) extracting, by an entity extraction module, from the labelled text file to obtain a plurality of relevant entities associated with at least one of a cluster in the plurality of clusters; (e) annotating, in the sectioning module, the standard text file by the extracted plurality of relevant entities to obtain an annotated enriched text file; (f) identifying, by a sectioning module, a plurality of section boundaries to obtain a sectioned data, wherein the sectioned data comprises a plurality of relationship associated with set of relevant entities; and (g) extracting, by the entity extraction module, relevant sections of the plurality of documents based on the plurality of relationship associated with the set of relevant entities.

In an embodiment, format of the input document may be at least one of a word, a Portable Document Format (PDF), a text, a Rich Text Format (RTF). In one embodiment, the plurality of clusters may be obtained based on at least one of a type, a domain and a content distribution of the document. In an embodiment, the plurality of section boundaries may be identified based on the annotated enriched text file, a linguistic, a semantic and a plurality of domain specific features. In an embodiment, a specific weight may be assigned to each of the plurality of domain specific features.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

FIGS. 4A, 4B, and 4C illustrates an exemplary user interface (UI) view of a system on a device of a user in accordance with embodiments of the present disclosure.

DETAILED DESCRIPTION

Figure 1:
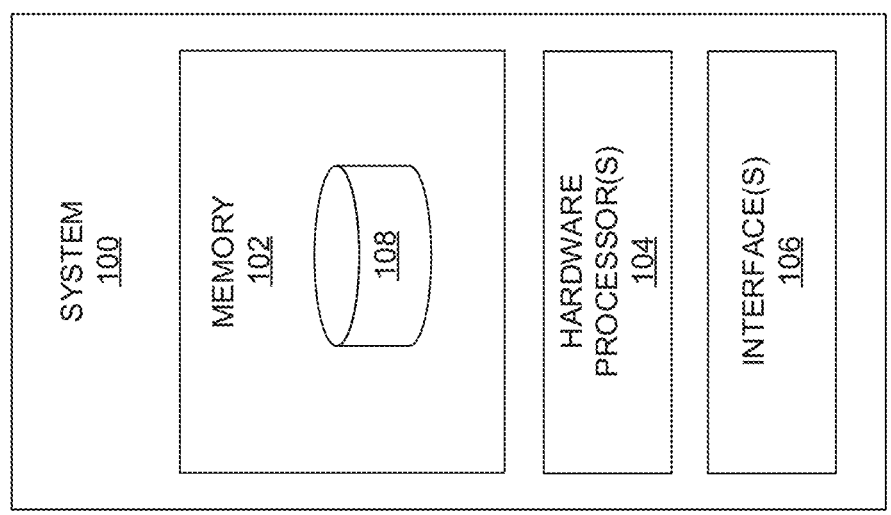
FIG. 1 illustrates a block diagram of a system for extraction of a relevant sections in a plurality of documents in accordance with an embodiment of the present disclosure.

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims.

Embodiments of the present disclosure presents one or more technological improvements as solutions to one or more of the above-mentioned technical problems recognized in conventional systems. In one embodiment, a method and a system for extraction of relevant (also referred as related) sections from a plurality of documents. The relevant sections are extracted by identifying boundaries for sections based on enhanced Conditional Random Fields (CRF) technique from the plurality of documents is described. Embodiments of the present disclosure receives one or more input documents such as resumes but not limited to and documents related to pharmacy, real estate deeds etc., from a user. The proposed method enhances existing CRF and MaxEnt techniques, further including domain knowledge and document style features to obtain key relevant sections of the document. Further the extracted relevant information/sections are displayed to the user.

Referring now to the drawings, and more particularly to FIG. 1 through FIG. 4C, where similar reference characters denote corresponding features consistently throughout the figures, there are shown preferred embodiments and these embodiments are described in the context of the following exemplary system and/or method.

FIG. 1 illustrates a block diagram of a system 100 for extraction of a relevant sections in a plurality of documents in accordance with an embodiment of the present disclosure. In an embodiment, the system 100 includes one or more processors 104, communication interface device(s) or input/output (I/O) interface(s) 106, and one or more data storage devices or memory 102 operatively coupled to the one or more processors 104. The memory 102 comprises a database 108. The one or more processors 104 that are hardware processors can be implemented as one or more microprocessors, microcomputers, microcontrollers, digital signal processors, central processing units, state machines, logic circuitries, and/or any devices that manipulate signals based on operational instructions. Among other capabilities, the processor(s) is configured to fetch and execute computer-readable instructions stored in the memory. In an embodiment, the system 100 can be implemented in a variety of computing systems, such as laptop computers, notebooks, hand-held devices, workstations, mainframe computers, servers, a network cloud and the like.

The I/O interface device(s) 106 can include a variety of software and hardware interfaces, for example, a web interface, a graphical user interface, and the like and can facilitate multiple communications within a wide variety of networks N/W and protocol types, including wired networks, for example, LAN, cable, etc., and wireless networks, such as WLAN, cellular, or satellite. In an embodiment, the I/O interface device(s) can include one or more ports for connecting a number of devices to one another or to another server.

The memory 102 may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes.

The database 108 may store information but are not limited to, a plurality of parameters obtained from one or more sensors, wherein the parameters are specific to an entity (e.g., user, device, machine, equipment, and the like). Parameters may comprise sensor data captured through the sensors either connected to the user and/or machine. Further, the database 108 stores information pertaining to inputs fed to the system 100 and/or outputs generated by the system (e.g., at each stage), specific to the methodology described herein. More specifically, the database 108 stores information being processed at each step of the proposed methodology.

Figure 2:
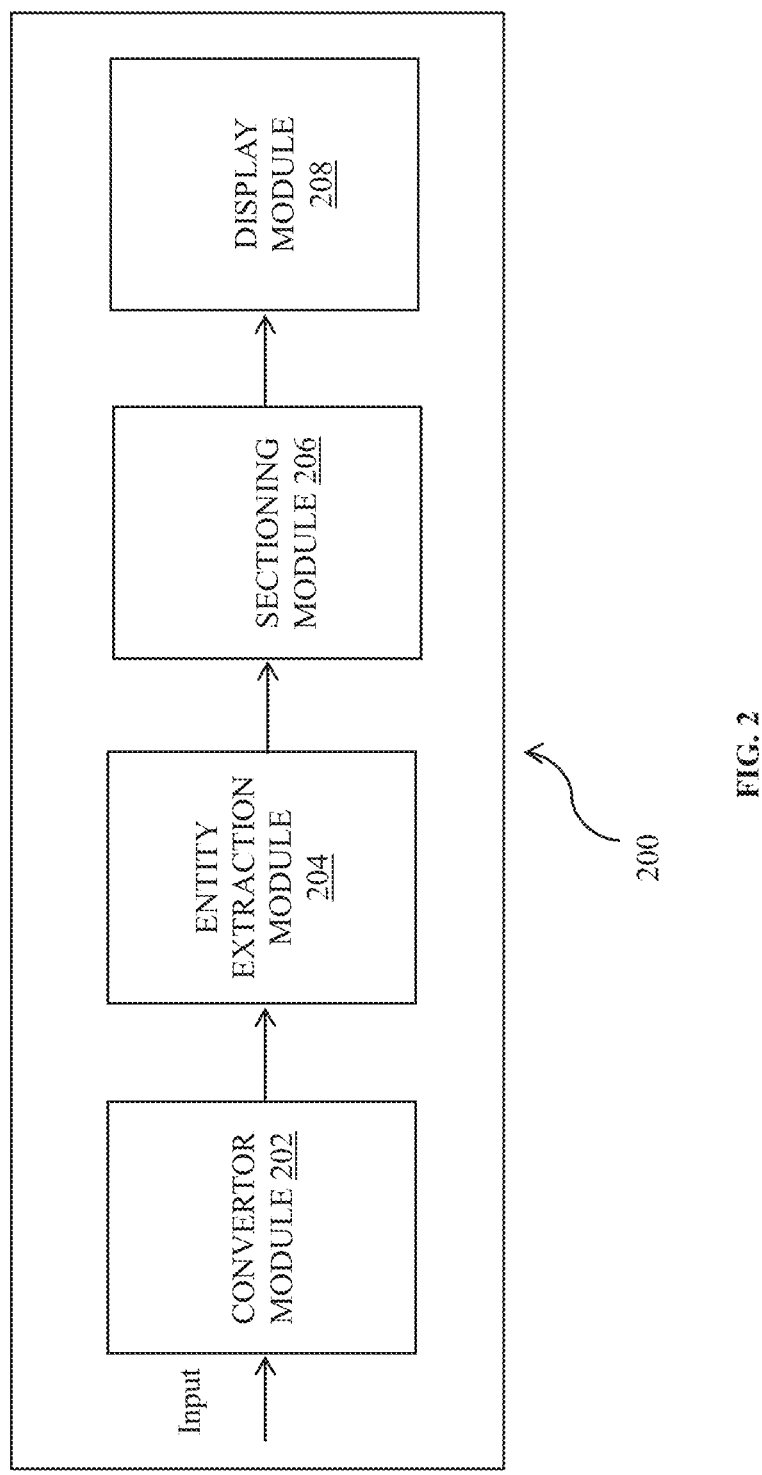
FIG. 2 is an exemplary system for extraction of a relevant sections in a plurality of documents in accordance with an embodiment of the present disclosure.

FIG. 2 is an exemplary system 200 for extraction of relevant sections in a plurality of documents in accordance with an embodiment of the present disclosure. The system 200 includes a convertor module 202, an entity extraction module 204, a sectioning module 206, and a display module 208. As illustrated in the FIG. 2, a user may submit or upload one or more documents to the system 200. The system 200 analyzes or summarizes the documents to identify and extract relevant (also referred as related) sections from the submitted documents. The relevant sections are displayed to the user on a display module 208. The system 200 receives input documents from the user for processing. In an embodiment, the input document may a resume (or curriculum vitae (CVs)) of the user (e.g., a candidate). In an embodiment, the input documents may be in varying format such as a word but not limited to a Portable Document Format (PDF), a text, a Rich Text Format (RTF) etc. The convertor module 202 is configured to convert the input documents to a standard text file format, while retaining all the information of the original format.

In an exemplary embodiment, process of conversion of the input document has two steps.
  i. Document to HTML conversion:
     a. For example, open source tool are used to convert the document into html.
  ii. HTML to Text conversion—Documents may be written with variety of style. Some candidates write entire resumes in tabular format while some writes in plain text format and some write with the mixture of tabular and plain text. Also document has different font style and size. The style information can be very useful in identifying the entities and section boundary. A classifier, while converting html to text, having variations in original format which is configured with ordered list and unordered list are marked with special character so that out classifier understands difference between normal line and list lines. Further, the tabular structure vary such that entities are clearly identified.

In an embodiment, the variations in tabular structure are as follows:
  a. If there are only two columns in table, and $1^{st}$ column of all the rows are in bold style, consider first column text as a header and corresponding $2^{nd}$ column text as its value.
  b. If table has more than 3 columns, consider top row column as label and corresponding next row column text as value for that label.

In an embodiment, each of standard text file is clustered (e.g., a plurality of clusters can be C1, C2, . . . , Cn) based on at least one parameters. In an embodiment, the at least one parameters may include but not limited to a type, a domain and a content distribution of the input document. In an embodiment, the types of information includes a personal information, Education, Experience, Skills, languages, certifications. For example, the personal information of the user can be a candidate first name and last name, address, email, phone number, etc. Similarly, the educational information of the user can be e.g., diploma/degree, university, year. Further, the experience information of the user can be e.g., date range, company/organization name, job title, skills used, and salary.

The entity extraction module 204 is configured to extract relevant entities from each clustered text file document. In an embodiment, the extraction uses pattern matching over enhanced text of resume using syntactic parse information of language as well as semantic relations among objects and subjects.

In an exemplary embodiment, the extraction of the entities from the document are divided into two parts:
  i. Closed class entities: Entities such as date, email, contact details, degree, are closed class entities means they have set of predefined variations. For example, date can be written as dd/mm/yyyy, mm/dd/yyyy, $d^{th}$ month year, and so on. For degree, possible variations and names are known. To process these kind of entities, a pattern based approach are utilized which uses different regular expressions for these different entities.
  ii. Open class entities: Entities whose values are not fixed or it has so many variations that cannot capture by fixed set of patterns are called as open class entities. For these entities, a supervised machine learning methods are utilized. In an embodiment, a maximum entropy algorithm and a conditional random fields (CRF) are used for extracting the entities. The conditional random fields are usually used for predicting next word of for classifying next word based on the current word and previous word. In an embodiment, the word as a feature for entity extraction, these features are some domain specific features, POS tagging features and wordNet based features.

In an embodiment, the relevant entities are extracted based on an enhanced Conditional Random Field (CRF) and MaxEnt techniques. In another embodiment, the enhanced Conditional Random Field (CRF) includes a pattern based recognition features such as a gazette and a regex. In an embodiment, the entities may include role, employer, client name, project title, etc.

Further, each of the extracted entities are processed in the sectioning module 206, where in additional features and document specific features are added based on domain knowledge. The entities with additional features are further processed in the sectioning module 206 to identify relevant sections by identifying the section boundary based on the enhanced CRF techniques. In an embodiment, the features may be a style of document, a plurality of predefined rule based features, a pattern based features.

In an embodiment, the CRF is configured for section boundary identification by considering each line as one literal, which uses a word as a literal. In an embodiment, extracting features of each line, features such as domain knowledge based features, formatting information, extracted entity names, etc., for a line.

For example, with a project boundary, a relation between the entities extracted from that particular section are obtained. In an embodiment, such possible relations are: role-duration, role-project, project-duration, skill-project etc. Typically, the CRF is mainly used for word prediction or sequence labelling with the use of word level features. The embodiments of this present approach, detecting boundaries and are indicated by lines i.e., starting line of the section boundary and ending line of section boundary. The CRF is modified in such a way so that instead of word it takes lines as an input.

For example, in step 1, domain level features, a document style features i.e., bold, italic, text color, text size etc. and train the CRF classifier for entire document, considering each line as separate sequence. In step 2, some additional features are used. These features are the entities extracted from previous entity extraction step. For example, if role: team member is extracted in the line from entity extraction algorithm, use "Role_available" feature for this line additional to style features and domain features and then train the CRF. Upon completing all three steps, there is a combine step, take output from all the three steps and combine three output to get single boundary (start and end) of particular section.

The related sections from the plurality of the document thus obtained are displayed to the user on the display module 208.

Figure 3:
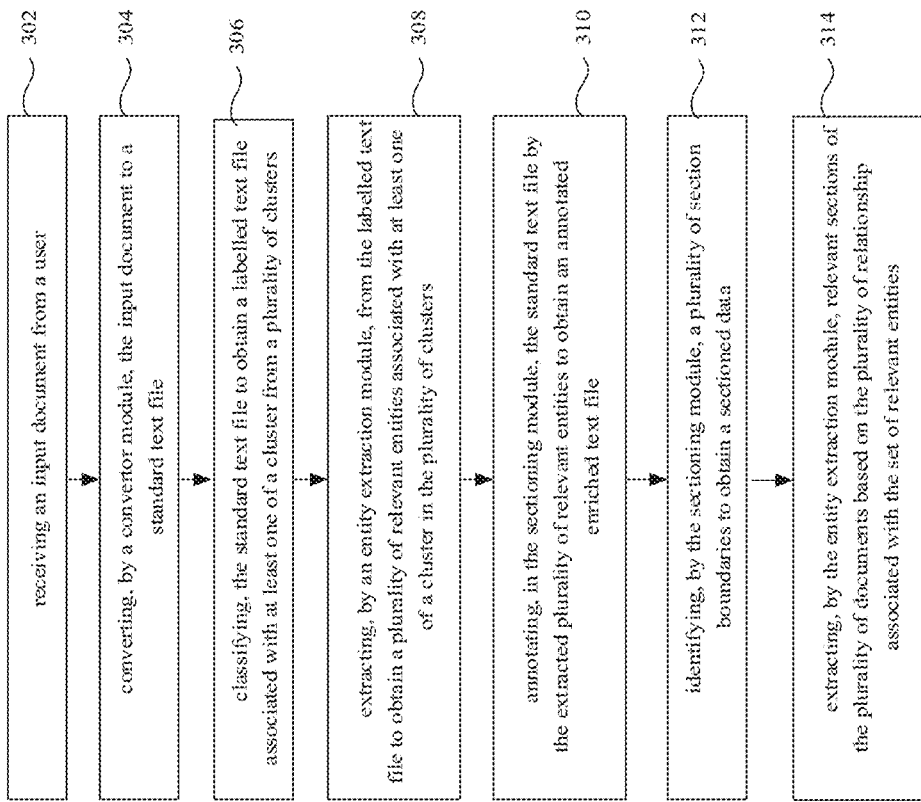
FIG. 3 is an exemplary flow diagram illustrating a method of extracting relevant sections in a plurality of documents in accordance with embodiments of the present disclosure.

FIG. 3 is an exemplary flow diagram illustrating a method of extracting relevant sections in a plurality of documents in accordance with embodiments of the present disclosure. In an embodiment, the system 100 comprises one or more data storage devices or the memory 102 operatively coupled to the one or more hardware processors 104 and is configured to store instructions for execution of steps of the method by the one or more processors 104. The flow diagram depicted is better understood by way of following explanation/description.

The steps of the method of the present disclosure will now be explained with reference to the components of the system 200 as depicted in FIG. 2. In an embodiment of the present disclosure, at step 302, the one or more hardware processors 104, receives the input document from the user. In an embodiment, a format of the input document may be at least one of a word, a Portable Document Format (PDF), a text, a Rich Text Format (RTF) etc. In an embodiment of the present disclosure, at step 304, the one or more hardware processors 104, converts, the input document to a standard text file. The input document is converted to a standard text format in two stages. In first stage, the input document is converted to HTML format using open source tool e.g., Apache Tika.

Further, in second stage of conversion the HTML format is converted to standard text format, while retaining the difference between normal and list lines. The features of knowledge specific to domain is also included in the proposed HTML to text converted. In an embodiment of the present disclosure, at step 306, the one or more hardware processors 104, classify, the standard text file to obtain a labelled text file associated with at least one of a cluster from a plurality of clusters. In an embodiment, the plurality of clusters is obtained based on at least one of a type, a domain and a content distribution of the document.

In an embodiment of the present disclosure, at step 308, the one or more hardware processors 104, extract, from the labelled text file to obtain a plurality of relevant entities associated with at least one of a cluster in the plurality of clusters. In an embodiment, extraction is based on an enhanced version of the CRF and MaxEnt technique and also includes pattern or feature based recognition techniques such as gazette and regex. Considering a use case example of a resume, relevant entities such as candidate's name, contact details, education qualifications such as degree, institute name, performance, prior experience details that include project details such as project title, client name, duration, team size, roles and responsibility, tools and technology, skills set and so are extracted in the entity extraction module (204).

In an embodiment of the present disclosure, at step 310, the one or more hardware processors 104, annotate, the standard text file by the extracted plurality of relevant entities to obtain an annotated enriched text file. In an embodiment, the plurality of section boundaries are identified based on at least one of the annotated enriched text file, a linguistic, a semantic and a plurality of domain specific features. In an embodiment, the sectioning of extracted entities occurs in two stages in the sectioning module (206). In the first stage of sectioning, additional domain specific features are included in the extracted entities by CRF based technique, where in specific weight is assigned to each domain knowledge feature. For example, the weight calculation is performed such that the prominent domain features are given higher weightage. In an embodiment, the weight calculation technique varies among different domains to ensure due importance is given to the prominent features of that specific domain. The CRF technique utilizes domain specific features to test distribution, however in during random distribution statistical methods are used to test distribution to make the method efficient for weight calculation. Further in the second stage sectioning of related identities are performed where in the weight calculated is also a parameter.

In an embodiment of the present disclosure, at step 312, the one or more hardware processors 104, identify, by a sectioning module (206), a plurality of section boundaries to obtain a sectioned data, wherein the sectioned data includes a plurality of relationship associated with set of relevant entities. In an embodiment, a second stage of sectioning wherein the related entities are identified to form sections by identifying the section boundary based on an enhanced version of the CRF technique by identifying section boundary. The enhanced version of CRF technique proposes to identify boundary of sentence based features instead of the existing word based identification. The related sentences boundaries are identified and converted to a feature vector, which is processed to result in the formation of relevant entity or section.

In an embodiment of the present disclosure, at step 314, the one or more hardware processors 104, extract, by the entity extraction module (204), relevant sections of the plurality of documents based on the plurality of relationship associated with the set of relevant entities. In an embodiment, the sectioned data is shared with the entity extraction module (204), as test data to train the module which is used to extract relevant entities based on an enhanced version of the CRF and MaxEnt technique and also includes pattern based recognition features such as gazette and regex.

In an embodiment of the present disclosure, at step 316, the one or more hardware processors 104, displays, the relevant sections of the plurality of document.

FIG. 4A illustrates an example User Interface (UI) of the system 200 on a device of the user, where the user uploads one or more document such as resume, in accordance with some embodiments of the present disclosure. This UI allows the user to upload and submit one or more resumes, whose sections are to be extracted.

Figure 4B:
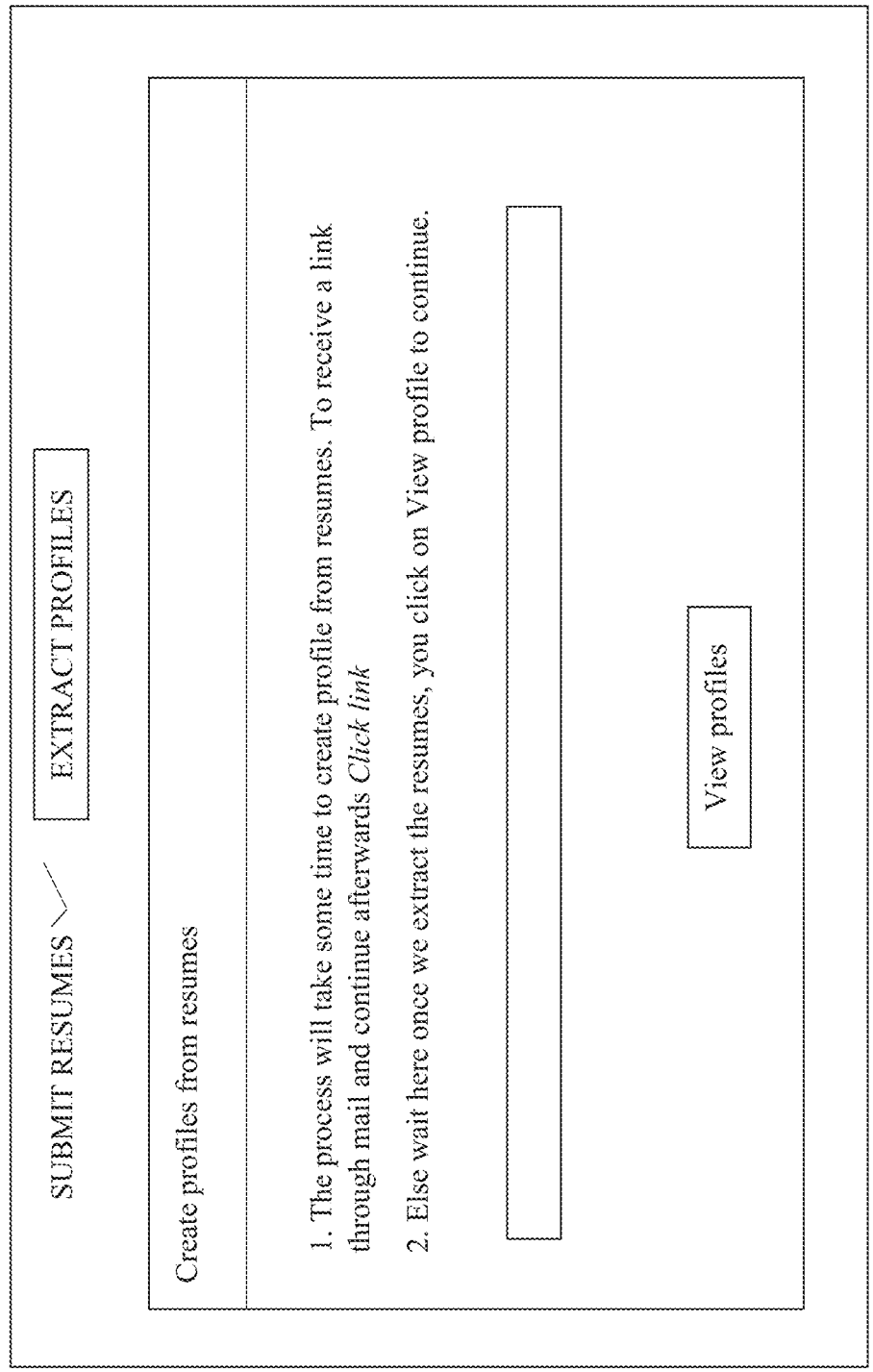

FIG. 4B illustrates an example UI of the system 200 on the device of the user, where the user requests for extraction of features or sections from one or more documents such as resume, in accordance with some embodiments of the present disclosure.

FIG. 4C illustrates an example UI of the system on the device of the user, where the user may view the extracted sections. Considering a use case example of a resume, relevant and related entities such as candidate's name, contact details, education qualifications such as degree, institute name, performance, prior experience details that include project details such as project title, client name, duration, team size, roles and responsibility, tools and technology, skills set and so are extracted in the entity extraction module, in accordance with some embodiments of the present disclosure.

Experiments and Results

Baseline Method

As baseline algorithm for sectioning, a set of patterns and rules based on domain knowledge are used. Each section has specific set of entities in some order and that order is not necessarily same for all documents. After performing analysis of a large set, a few thousands of resume documents, with rules for each of the section. For example, education section has entities such as degree, specialization, performance while project section starts with project title or client or duration. The same way personal profile, career details etc. sections are identified for base lining.

Experimentation

For experimentation, considering corpus of approximately 1100 free-form resume profile documents received from the TA team with an average size of 5 pages. Data has been split in 70%-30% ratio for training and testing i.e., 770 profiles for training and 330 for testing. These are manually labelled for the sections, with each resume having one instance each of personal information, educational details, career profile sections whereas multiple instances (average number of project per resume=4) of the project details section. For baseline, handcrafted patterns, rules and text formatting information used to detect section boundary. For sections like education section, personal profile section etc., patterns has been used while for project section and career section complex rules are created which is based on patterns, text formatting and domain knowledge. Based on this approach, identification of project section gave us F-measure of 0.63 on testing dataset. For new CRF based approach, set of features is assigned to each line in the sequence and train CRF for all the training sequence i.e., 770 sequence as our training set contains 770 profiles. For testing provide data in same manner except the labels. The proposed method gave us F-measure of 0.82 on training set which shows significant improvement over the baseline.

Embodiments of present disclosure automates a task of sectioning in a document, by an enhanced conditional random fields (CRF), a popular probabilistic sequence prediction method for identifying section boundaries in a document. The enhanced CRF based method, while also considering and including domain knowledge based document style features improves the sectioning accuracy significantly over a baseline method which is based on manually identified patterns. The accurate section identification has enabled a system for automated candidate profile extraction and assessment. The embodiments of the present disclosure, facilitates, a CRF based approach for sentence label prediction in identifying section boundaries of a resume document. Feature engineering using domain knowledge to apply CRF for section identification. Accuracy improvement in section identification. Improving automated identification of entity and relations between entities. The use of CRF helps as it preserves longer dependencies by including following as input: the previous line (along with features), labels of previous lines, current line and features; to predict the current line label. Such sequential set of features preserves the section information in a better manner helping the identification of section boundary better.

The embodiments of the present disclosure use sequence regularity for section identification and the MaxEnt for section head identification. The sequential regularity manifested in multiple forms or their possible mixtures, to identify the section headings and other boundary. The CRF is utilized as a sequential model which uses features of each line and learn dependencies across the line. The embodiments of the present disclosure in which clustering resumes based on their domains i.e., IT domain, banking, etc. As different domain has different entity of interest and also few sections are also differs from domain to domains.

The embodiments of the present disclosure which find sections and thereby helps in finding relation between the entities. The embodiments of the present disclosure addresses the problem by classification based approach which has higher extraction accuracy. The CRF are utilized for section boundary identification by considering each line as one literal which is different than traditional CRF. The features extraction of each line, features such as domain knowledge based features, formatting information, extracted entity names etc., Boundary of a section is a line (start of a section and end of a section) and considering sequence of line one section. The CRF uses previous label, previous input and current input as an input to current node and makes the decision about current label. Further, by using previous label and previous input, the CRF captures long term dependencies between the line and gives better results. The line-based sequential patterns learnt by CRF are probabilistic and hence can give higher accuracies with multiple formats of resumes.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:

1. A processor implemented method for extracting relevant sections from a plurality of documents, comprising:
   (a) receiving an input document from a user;
   (b) converting, by a convertor module (202), the input document to a standard text file;
   (c) classifying, the standard text file to obtain a labelled text file associated with at least one of a cluster from a plurality of clusters, wherein the plurality of clusters are obtained based on at least one of a type, a domain and a content distribution of the input document;
   (d) extracting, by an entity extraction module (204), from the labelled text file to obtain a plurality of relevant entities associated with the at least one of a cluster from the plurality of clusters, wherein the plurality of relevant entities are extracted based on an enhanced Conditional Random Field (CRF) technique, a Maximum Entropy (MaxEnt) technique and pattern or feature based recognition techniques;
   (e) annotating, in the sectioning module (206), the standard text file by the extracted plurality of relevant entities to obtain an annotated enriched text file;
   (f) identifying, by a sectioning module (206), a plurality of section boundaries to obtain a sectioned data, wherein the sectioned data comprises a plurality of relationship associated with a set of relevant entities, wherein each of the extracted relevant entities are processed by adding document specific features and domain specific features, wherein the enhanced CRF is configured for section boundary identification by considering each line as a separate sequence, wherein a CRF classifier is trained considering each line as the separate sequence using the domain specific features and the document specific features to identify the plurality of section boundaries, wherein related sentences boundaries are identified and converted to a feature vector, and the feature vector is processed to result in formation of one or more relevant sections; and
   (g) extracting, by the entity extraction module (204), relevant sections of the plurality of documents based on the plurality of relationship associated with the set of relevant entities.

2. The processor implemented method of claim 1, wherein format of the input document is at least one of a word, a Portable Document Format (PDF), a text, a Rich Text Format (RTF).

3. The processor implemented method of claim 1, wherein the plurality of section boundaries are identified based on the annotated enriched text file, a linguistic, a semantic and a plurality of domain specific features.

4. The processor implemented method of claim 1, wherein a specific weight is assigned to each of the plurality of domain specific features.

5. A system (100) to extract relevant sections from a plurality of documents, wherein the system comprising:
   a memory (102) storing instructions;
   one or more communication interfaces (106); and
   one or more hardware processors (104) coupled to the memory (102) via the one or more communication interfaces (106), wherein the one or more hardware processors (104) are configured by the instructions to:
   (a) receive, an input document from a user;
   (b) convert, the input document to a standard text file;
   (c) classify, the standard text file to obtain a labelled text file associated with at least one of a cluster from a plurality of clusters, wherein the plurality of clusters are obtained based on at least one of a type, a domain and a content distribution of the input document;
   (d) extract, from the labelled text file to obtain a plurality of relevant entities associated with at least one of a cluster in the plurality of clusters, wherein the plurality of relevant entities are extracted based on an enhanced Conditional Random Field (CRF) technique, a Maximum Entropy (MaxEnt) technique and pattern or feature based recognition techniques;
   (e) annotate, the standard text file by the extracted plurality of relevant entities to obtain an annotated enriched text file;
   (f) identify, a plurality of section boundaries to obtain a sectioned data, wherein the sectioned data comprises a plurality of relationship associated with a set of relevant entities, wherein each of the extracted relevant entities are processed by adding document specific features and domain specific features, wherein the enhanced CRF is configured for section boundary identification by considering each line as a separate sequence, wherein a CRF classifier is trained considering each line as the separate sequence using the domain specific features and the document specific features to identify the plurality of section boundaries, wherein related sentences boundaries are identified and converted to a feature vector, and the feature vector is processed to result in formation of one or more relevant sections; and
   (g) extract, relevant sections of the plurality of documents based on the plurality of relationship associated with the set of relevant entities.

6. The system of claim 5, wherein format of the input document is at least one of a word, a Portable Document Format (PDF), a text, a Rich Text Format (RTF).

7. The system of claim 5, wherein the plurality of section boundaries are identified based on the annotated enriched text file, a linguistic, a semantic and a plurality of domain specific features.

8. The system of claim 5, wherein a specific weight is assigned to each of the plurality of domain specific features.

* * * * *